(12) United States Patent
Park et al.

(10) Patent No.: US 11,619,855 B2
(45) Date of Patent: Apr. 4, 2023

(54) METHOD AND APPARATUS FOR MITIGATING ADVERSE EFFECTS OF BONDING WIRE OF EXTERNAL OPTICAL MODULATORS

(71) Applicant: OE Solutions Co., Ltd., Gwangju (KR)

(72) Inventors: Moon Soo Park, Irvine, CA (US); Tae Young Jeon, Gwangju (KR)

(73) Assignees: OE SOLUTIONS AMERICA, INC., Ridgefiled Park, NJ (US); OE SOLUTIONS CO., LTD., Gwangju (KR)

( * ) Notice: Subject to any disclaimer, the term of this patent is extended or adjusted under 35 U.S.C. 154(b) by 0 days.

(21) Appl. No.: 17/227,352

(22) Filed: Apr. 11, 2021

(65) Prior Publication Data

US 2021/0232017 A1    Jul. 29, 2021

Related U.S. Application Data

(62) Division of application No. 16/554,464, filed on Aug. 28, 2019, now Pat. No. 11,009,763.

(Continued)

(51) Int. Cl.
*G02F 1/225* (2006.01)
*G02F 1/035* (2006.01)
(Continued)

(52) U.S. Cl.
CPC .............. *G02F 1/225* (2013.01); *G02F 1/015* (2013.01); *G02F 1/0356* (2013.01); *G02F 1/21* (2013.01);
(Continued)

(58) Field of Classification Search
CPC .. H04B 10/40; H04B 10/548; H04B 10/5051; H04B 10/5161; H04B 10/588;
(Continued)

(56) References Cited

U.S. PATENT DOCUMENTS

| | | | |
|---|---|---|---|
| 6,590,691 B1* | 7/2003 | Nagra | ................... G02F 1/2255 359/245 |
| 7,031,558 B2 | 4/2006 | Tanbakuchi | |
| 2004/0070811 A1* | 4/2004 | Matsushima | ........... H01L 23/66 359/254 |

FOREIGN PATENT DOCUMENTS

| | | |
|---|---|---|
| JP | 2004227162 A | 8/2004 |
| JP | 2013089096 A | 5/2013 |

(Continued)

OTHER PUBLICATIONS

Leeson, D.B., "Impedance Matching," EE246-Microwave Engineering, Oct. 29, 1999, 10 pages.
(Continued)

*Primary Examiner* — Michael P Mooney
(74) *Attorney, Agent, or Firm* — Ichthus International Law PLLC

(57) ABSTRACT

An optical transceiver including a submount, a Mach-Zehnder Modulator (MZM), bonding wires, and a low pass filter type matching network is provided. The MZM includes an input port and an output port and disposed on the submount. The bonding wires are coupled to the submount and the MZM. The low pass filter type matching network is coupled to the bonding wires and is configured to absorb inductance of the bonding wires at a high frequency.

9 Claims, 15 Drawing Sheets

Related U.S. Application Data

(60) Provisional application No. 62/724,890, filed on Aug. 30, 2018.

(51) Int. Cl.
*H04B 10/516* (2013.01)
*H04B 10/40* (2013.01)
*H04B 10/548* (2013.01)
*G02F 1/015* (2006.01)
*G02F 1/21* (2006.01)
*H04B 10/588* (2013.01)
*H04B 10/50* (2013.01)

(52) U.S. Cl.
CPC ........... *G02F 1/2255* (2013.01); *H04B 10/40* (2013.01); *H04B 10/5161* (2013.01); *H04B 10/548* (2013.01); *H04B 10/588* (2013.01); *G02F 1/0157* (2021.01); *G02F 1/212* (2021.01); *H04B 10/5051* (2013.01)

(58) Field of Classification Search
CPC ...... G02F 1/015; G02F 1/2255; G02F 1/0356; G02F 1/212; G02F 1/225; G02F 2001/0157; H01L 23/66
USPC ........................................................ 385/1–3
See application file for complete search history.

(56) References Cited

FOREIGN PATENT DOCUMENTS

| | | |
|---|---|---|
| KR | 100418095 B1 | 2/2004 |
| KR | 1020130073278 A | 7/2013 |
| KR | 101371930 B1 | 3/2014 |
| WO | WO2017040924 A1 | 3/2017 |

OTHER PUBLICATIONS

Pan, Jianbiao, et al., "Wire Bonding Challenges in Optoelectronics Packaging," SSME Technical Papers, TP04PUB284, Society of Manufacturing Engineers, 2004, 10 pages.

Kwon, O.K., et al. "Improvement of modulation bandwidth in electroabsorption-modulated laser by utilizing the resonance property in bonding wire," Optics Express, May 21, 2012.

\* cited by examiner

Solid line: original data, Dashed line: with LPF + 50 Ohm

METHOD AND APPARATUS FOR MITIGATING ADVERSE EFFECTS OF BONDING WIRE OF EXTERNAL OPTICAL MODULATORS

CROSS-REFERENCES AND RELATED APPLICATION(S)

This application is a divisional of U.S. patent application Ser. No. 16/554,464 filed Aug. 28, 2019, which claims priority to U.S. Provisional Application No. 62/724,890, filed Aug. 30, 2018, titled "METHOD AND SYSTEM FOR MITIGATING ADVERSE EFFECTS OF BONDING WIRE OF EXTERNAL OPTICAL MODULATORS," the contents of which are incorporated herein by reference in their entirety.

TECHNICAL FIELD

The present disclosure relates to designs and techniques for mitigating effects of bonding wires, and in particular to the techniques for mitigating the effects of bonding wires of external optical modulators including Mach-Zehnder Modulators on a submount.

BACKGROUND

Bonding wires comprise an internal part of integrated circuit (IC) packaging for making connections to other circuitry, such as active devices including optical modulators and for input and output connections. As such, bonding wires are used extensively in packaging technology for chips. However, the bonding wires introduce extra parasitic inductance in the form of inductance in series with resistance at high frequencies. Further, the number of bonding wires, their heights from the substrate, frequency and dimension may often play an important role in overall circuit performance.

In the design of an optical communication system, for example, a Mach-Zehnder Modulator (MZM) is often used in the optical communication system. For data modulators, a semiconductor MZM is a preferred modulator design because it may be integrated with a tunable laser, and because of optical data modulation characteristics, low electrical drive voltage requirements, compact size and programmable transmission characteristics. Integrated transmitters are fabricated by coupling light from the primary laser output mirror. In the case of the MZM, the modulator input is split up into two optical waveguide paths or modulator arms, and then combined into a common data modulated output waveguide and a secondary waveguide that can be used for optical monitoring. Data is modulated onto the tunable laser output by driving one or both of the MZM arms with an electronic data signal that affects the physical properties of the MZM waveguides via electrical electrodes or interconnects.

When the MZM is mounted on a submount, bonding wires are used to connect input and output ports of the MZM to the submount. The bonding wires have a typical length of several hundred micrometers and is characterized by an inductance, e.g., inductance of about 0.2-0.3 nH and may cause many disadvantageous effects such as signal degradation. For example, the inductance of the bonding wires causes radio frequency (RF) attenuation at high frequencies, specially when a bandwidth of the MZM exceeds 10 GHz. Another problem associated with the inductance of the bonding wires is that the impedance of the MZM is usually lower than 50 Ohm, and thus seriously affect a high speed MZM packaging.

Therefore, there is a need for new and improved techniques for mitigating or reducing the disadvantageous effects of the bonding wires causing signal degradation in the design of an optical communication system.

SUMMARY

According to the present disclosure, an optical transceiver is provided. By way of example, an optical transceiver includes a submount, a Mach-Zehnder Modulator (MZM) including an input port and an output port, bonding wires coupled to the submount and the MZM, and a low pass filter type matching network coupled to the bonding wires. The low pass filter type matching network is configured to absorb inductance of the bonding wires at a high frequency.

In an aspect of the present technology, the low pass filter type matching network may include a $3^{rd}$ order Butterworth filter.

In another aspect of the present technology, the low pass filter type matching network may include a first matching network coupled to the output port of the MZM and the first matching network may include a resistor, an inductor, and a capacitor and be configured to absorb the inductance of the bonding wires.

In another aspect of the present technology, the low pass filter type matching network may include a second matching network coupled to the input port of the MZM and the second matching network may include an inductor, and a capacitor and be configured to absorb the inductance of the bonding wires. Further, the second matching network may further include a resistance in the form of input impedance.

In another aspect of the present technology, the low pass filter type matching network may include the first matching network coupled to the output port of the MZM and the second matching network coupled to the input port of the MZM.

In another aspect of the present technology, a method of implementing a low pass filter (LPF) type matching network configured to absorb inductance of bonding wires at a high frequency between an external optical modulator and a submount in a packaging of the external optical modulator is disclosed.

In another aspect of the present disclosure, the method of implementing the LPF type matching network may comprise providing a first matching network coupled to an input of the external optical modulator and a second matching network coupled to an output of the external optical modulator.

Further, in another aspect of the present disclosure, in the method, the external optical modulator may comprise a Mach Zehnder Modulator (MZM). Further, the high frequency may comprise a frequency greater than 10 GHz and the LPF type matching network may comprise a $3^{rd}$ order Butterworth filter.

BRIEF DESCRIPTION OF THE DRAWINGS

These and other features, aspects and advantages of the present disclosure will become better understood from the following description, appended claims, and accompanying figures where:

DETAILED DESCRIPTION

Figure 1:
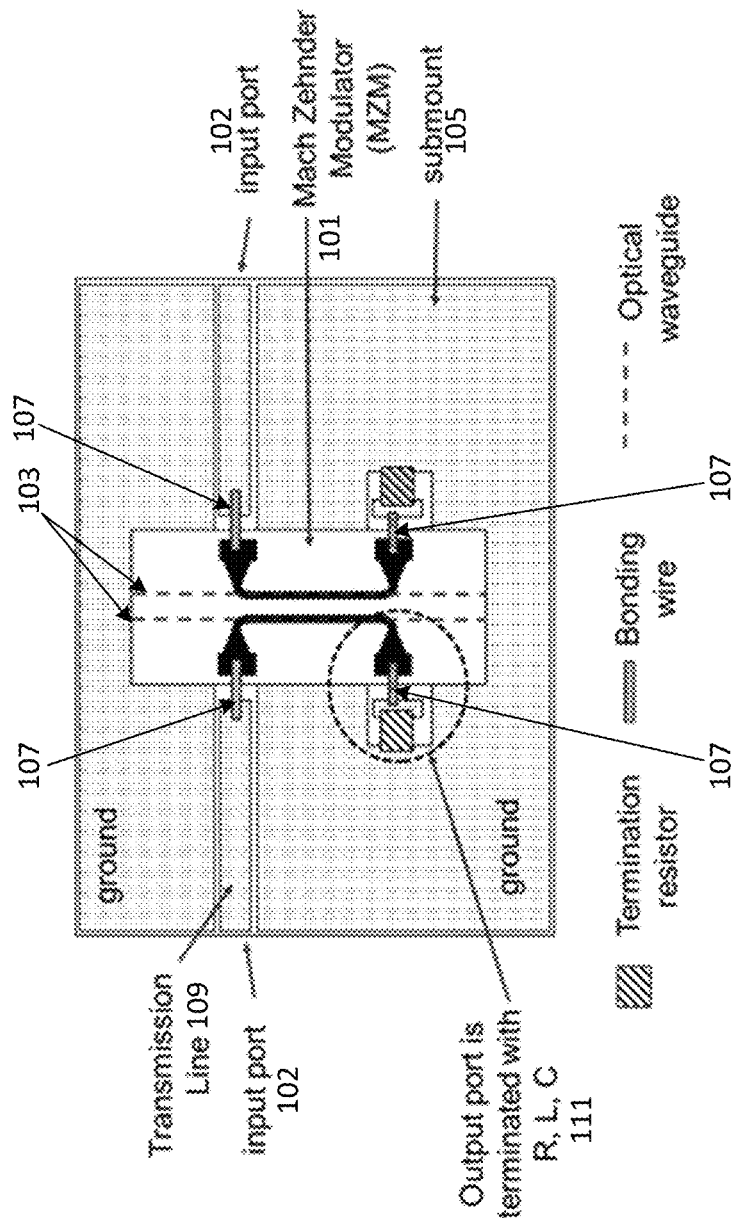
FIG. 1 is a diagram conceptually illustrating an embodiment of the present technology in accordance with an aspect of the present disclosure.

The detailed description of illustrative examples will now be set forth below in connection with the various drawings. The description below is intended to be exemplary and in no way limit the scope of the present technology. It provides a detailed example of possible implementation and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

Further, methods and devices that implement example embodiments of various features of the present technology are described herein. Reference in the description herein to "one embodiment" or "an embodiment" is intended to indicate that a particular feature, structure, or characteristic described in connection with the example embodiments is included in at least an embodiment of the present technology or disclosure. The phrases "in one embodiment" or "an embodiment" in various places in the description herein are not necessarily all referring to the same embodiment.

In the following description, specific details are given to provide a thorough understanding of the example embodiments. However, it will be understood by one of ordinary skill in the art that the example embodiments may be practiced without these specific details. Well-known circuits, structures and techniques may not be shown in detail in order not to obscure the example embodiments (e.g., circuits in block diagrams, etc.).

In packaging, bonding wires comprise an internal part of integrated circuit (IC) packaging for making connections to other circuitry such as active devices including optical modulators and for input and output connections. As such, bonding wires are extensively used in packaging technology for chips. However, it is well known that the bonding wires introduce extra parasitic inductance in the form of inductance in series with resistance at high frequencies. Further, the number of bonding wires, their heights from substrate, frequency and dimension may often play an important role in overall circuit performance. As such, extra inductance introduced by the bonding wires is considered as the main parameter of the bonding wires and at higher frequencies the extra inductance becomes a factor affecting the overall system performance, e.g., often degrading system performance.

The present technology disclosed herein provides solutions addressing the problems noted relating to the bonding wires in high speed packaging. In one aspect of the present disclosure, for illustration purposes of the present technology, in one example, a Mach-Zehnder Modulator (MZM) 101 including input ports and an output port may be disposed on a submount 105 as shown in FIG. 1. The MZM 101 may be typically driven by a differential driver and may compose a set of two optical waveguides 103 running in a semiconductor die chip and a set of two electrodes running on top of the two waveguides. In the example, one optical waveguide may be split into two optical waveguides 103 which are shown in the example in FIG. 1. The optical signals running in the two optical waveguides 103 may be then phase modulated in each arm of the modulator section 101 by differential electrical signals applied at each input port 102 of the MZM 101. The two phase-modulated signals may then be combined into one output optical waveguide. The two differentially phase modulated optical signals are combined in a way of in-phase or out-of-phase. In this way, the combined optical signal may result in an amplitude modulated signal. Also, the bottom of the MZM chip may be metallized and attached to a ground plane of the submount 105.

Generally, for high speed applications, the performance of a device may be limited by the electrical parasitic capacitance, series resistance, and bonding wire inductances. Especially, in the example, the inductance of the bonding wires 107 at the input port 102 of the MZM 101 adversely affect a frequency response of the MZM's gain, degrading the overall performance of the device. Therefore, the elimination or reduction of the adverse effect of the bonding wires such as the bonding wires 107 in the example is very desirable ad is important in improving the performance of a MZM response of the device.

As mentioned above, the MZM 101 shown in FIG. 1 may be implemented on a substrate and thus on a chip. The MZM 101 may be coupled to one or more transmission lines 109 at which an input signal may be applied. Also, one or more bonding wires 107 may be used to couple the one or more transmission lines and the MZM 101 via input ports 102. Further, an output port may be terminated with a passive network 111 including elements representing resistance (R), inductance (L), and/or capacitance (C). In the example of FIG. 1, a dotted circle indicates the passive network 111 coupled to the output port of the MZM 101.

Figure 2:
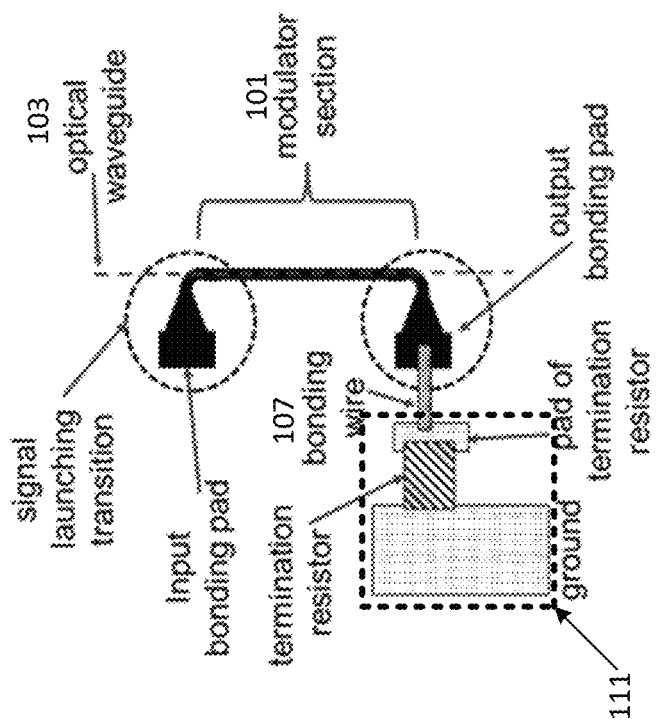
FIG. 2 is a diagram conceptually illustrating an embodiment of the present technology in accordance with an aspect of the present disclosure.

FIG. 2 provides a more detailed view of one side of the MZM of FIG. 1, in an aspect of the present technology, conceptually illustrating one implementation of inductance and/or capacitance on the chip. That is, the inductance and/or capacitance on the chip may be implemented or adjusted by changing a shape of the electrodes. Also, by adjusting the length of the bonding wire 107, the inductance may be modified. Further, by combining on-chip inductance, capacitance and bonding wire inductance, various types of matching network, for example the matching network 111, may be implemented at the input port and/or output port of the MZM 101. Further, the termination resistances may be implemented either by discrete resistors or on-board resistors embedded on the submount 105. Furthermore, the size of a pad of the resistor may be acting as a capacitor for the matching network 111 and thus the capacitance may be varied by adjusting the size of the pads.

In an aspect of the present disclosure, by utilizing the characteristics of a low pass filter (LPF), an input and/or output matching network 111 for MZM 101 may be designed to eliminate or reduce the adverse effects of parasitic elements including the inductance of bonding wires 107. Thus, modulation signals that is to be terminated may be fed back to the MZM 101, thereby improving the frequency response of the MZM 101 and as a result, the bandwidth of the MZM 101 may be significantly improved, and in one aspect of the present disclosure the effects of group delay (GD) caused by electrical components (e.g., bonding wires, etc.) may be mitigated significantly.

Referring back to FIG. 1, the MZM may include a transmission line located or disposed above the optical waveguide 103. The optical waveguide 103 may include a p-n junction which is acting as a capacitive loading to slow down a traveling speed of an electrical signal. In the example, optical signals may be phase modulated as an electrical modulating signal travels along the transmission line. In this way, the propagation speed of the electrical signal may be matched to some extent with the propagation speed of the optical signal. Further, in the example, due to the capacitive loading effect of the p-n junction, the characteristic impedance of the transmission line is usually less than 50 Ohms. Also, since the driving signal source is about 50 Ohm based, an impedance transformation (or impedance matching) may be implemented between the input 50 Ohm source impedance and the input impedance of the transmission line of a modulator.

There are various approaches for implementing a wideband impedance transformation. By way of example, one way to implement the wideband impedance transformation is to use a taper design technique which gives a smooth impedance transition from 50 Ohm to the input impedance of a modulator. However, one expected drawback of this approach, for example, using the taper design technique, is that the impedance of a bonding wire between a taper implemented on a submount and a modulator chip may not be included in the design of the taper. As a result, the impedance of the bonding wire may significantly affect a frequency response of a system when the designed modulator has a very wide bandwidth or operating at a high frequency.

Further, in many different applications a wideband modulator is commonly used with bandwidth of the wideband modulator exceeding far more than 20 GHz, but with degraded performance due to inductance or impedance of bonding wires. Therefore, in an aspect of the present disclosure, the present technology disclosed herein provides a technique or methodology providing a capability of absorbing the effects of the bonding wires.

In one implementation, in an aspect of the present disclosure, a low pass filter concept may be utilized to reduce or mitigate the effect of the impedance of the bonding wire. That is, in an aspect of the present disclosure, a low pass filter (LPF) or the like may be implemented between the source impedance of 50 Ohm and the input impedance of a modulator in such a way that the LPF is configured to absorb the impedance of the bonding wire as part of the LPF. That is, the LPF may be designed to have a 50 Ohm source impedance and the input impedance of the modulator. Further, in an aspect of the present disclosure, the bandwidth of the LPF is much wider than the bandwidth of a modulator chip. Further, to improve the system performance, the termination of the modulator needs to be dealt with. By controlling the impedance of the termination of the modulator, a frequency response, input impedance and group delay characteristics may then be controlled.

Figure 3:
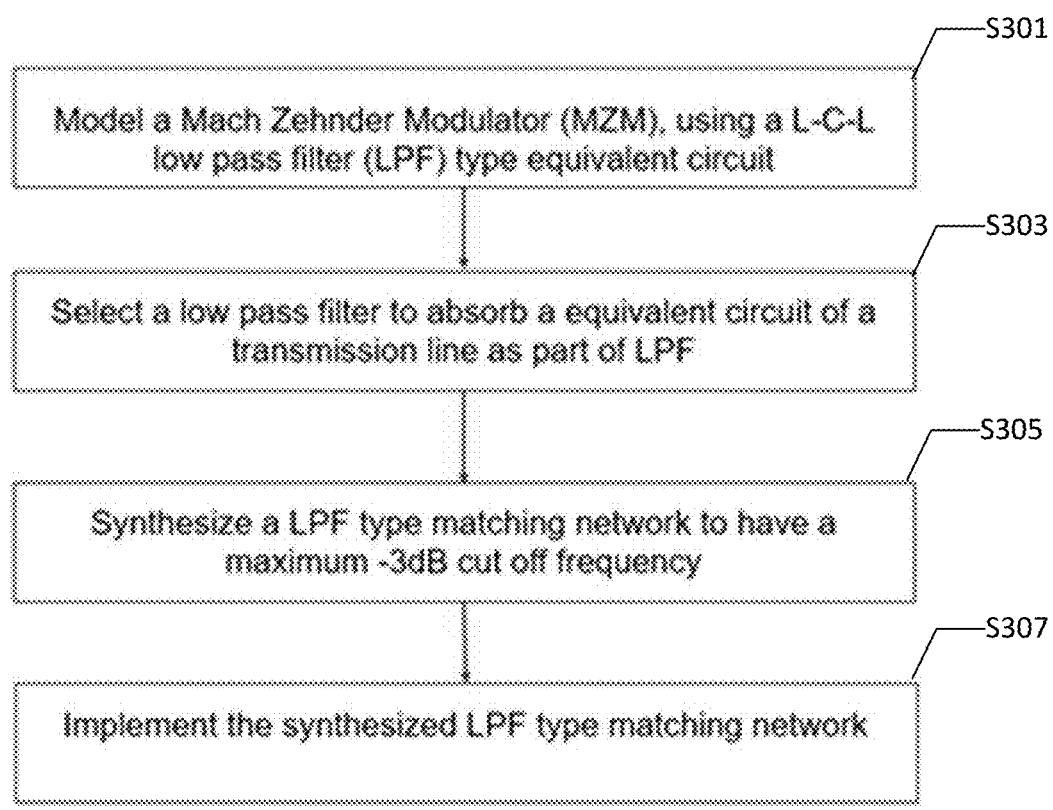
FIG. 3 is a flowchart conceptually illustrating an embodiment of the present technology in accordance with an aspect of the present disclosure.

FIG. 3 shows an example flowchart conceptually illustrating an example design methodology in an aspect of the present disclosure. By way of example, a design methodology for the termination of a modulator is provided. In the example, an inductance-capacitance-inductance (L-C-L) low pass filter (LPF) circuit topology may be used to approximate a modulator or a modulator section. The transmission line on an optical waveguide may be any transmission line type such as a CPS, CPW or microstrip line. In an aspect of the present disclosure, these transmission line types may be approximated as a simple microstrip line and may be approximated as a $3^{rd}$ order L-C-L lumped circuit.

In an aspect of the present disclosure, the above design methodology may be applied to a Mach Zehnder Modulator design. As mentioned above, FIG. 3 illustrates an example design flow in connection with the Mach Zehnder Modulator design. At S301, first, a Mach Zehnder Modulator (MZM) is modeled using a L-C-L low pass filter type (LPF) equivalent circuit. At S303, a low pass filter is designed and selected to absorb an equivalent circuit of a transmission line as part of the L-C-L LPF. At S305, a low pass filter type matching network is synthesized to have a maximum −3 dB cut off frequency. At S307, the synthesized low pass filter network is implemented to reduce or mitigate the effects of bonding wires of the MZM.

By way of example, in one implementation and in an aspect of the present disclosure, a $3^{rd}$ order low pass filter may be adopted to absorb an equivalent circuit of the transmission line as part of LPF. Further, since the modulator has a low impedance including high capacitance due to a capacitive loading, a $3^{rd}$ order L-C-L LPF circuit topology having a high capacitance value may be selected. In an aspect of the present disclosure, a Butterworth filter may be used for a candidate L-C-L LPF circuit topology. Butterworth filters have relatively high capacitance compared to other types of filters. Also, in another aspect of the present disclosure, other types of filters (i.e., other than Butterworth filters) may be used as long as the equivalent circuit of the modulator can be absorbed in the LPF (i.e., the other types of filters). However, the designed bandwidth needs to be wide enough to meet the required bandwidth of the modulator. Further, a designed LPF (i.e., a Butterworth filter) may be synthesized to have a maximum −3 dB cut off frequency, where the capacitance of the converted LPF is the same as the one of the approximated $3^{rd}$ order equivalent circuit of the modulator. In this case, in an aspect of the present disclosure, the inductance of the synthesized LPF may be equal to or greater than those of the approximated equivalent circuit of the modulator. In another aspect of the present disclosure, the differences may be taken into account when the termination and the input matching networks are synthesized.

To further illustrate the present design methodology, designs details are provided below to give a better understanding of various aspects of the present technology.

Figure 4A:
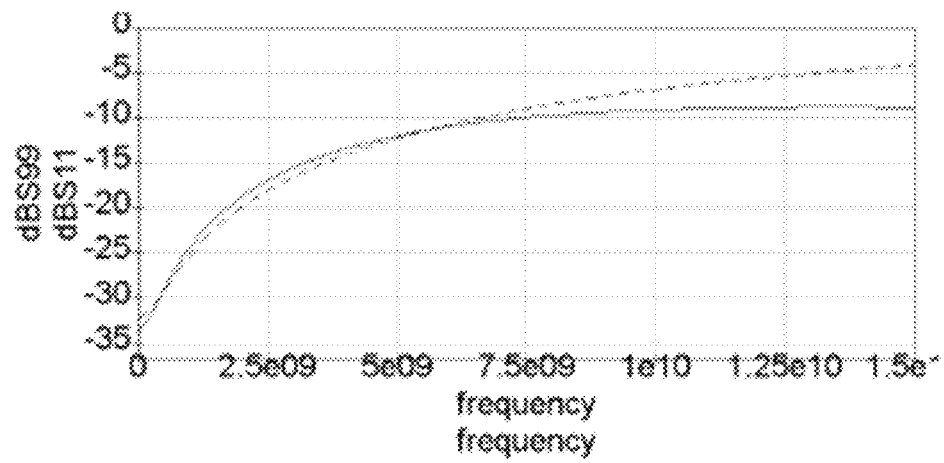
FIGS. 4A and 4B are examples of a frequency response and corresponding Smith Chart conceptually illustrating various aspects of an embodiment of the present technology in accordance with an aspect of the present disclosure.
Figure 4B:
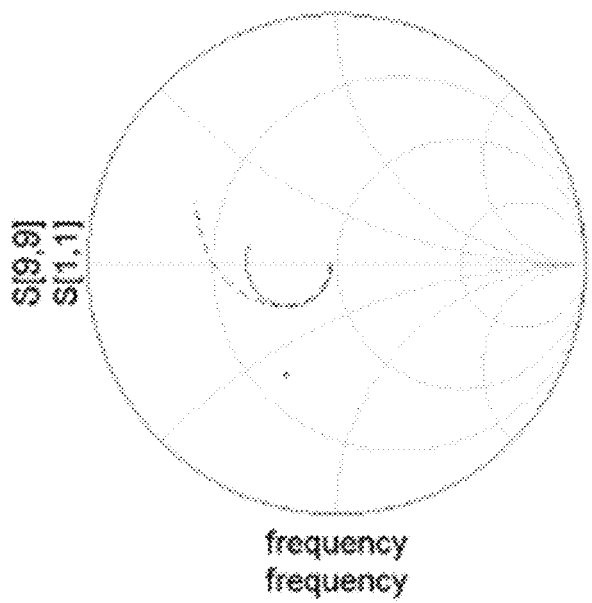

Approximation of Modulator. From original S-parameters extracted from an MZM design, a modulator may be approximated as an L-C-L circuit. For example, input reflection curves of both original design s-parameter and extracted L-C-L circuit of the modulator are shown in FIG. 4A. In FIG. 4A, original data (e.g., dBS11) is shown as a solid line and the input reflection data (e.g., dBS99) of the extracted L-C-L circuit is shown as a dashed line. For illustration purposes, the MZM modulator that is designed is for 10 Gb/s, and thus the response curve of the approximation (e.g., dBS99) relatively matches well with the original data (e.g., dBS11) up to about 10 GHz. Corresponding Smith Charts of dBS11 (solid line) and dBS99 (dashed line) are shown in FIG. 4B.

Figure 5A:
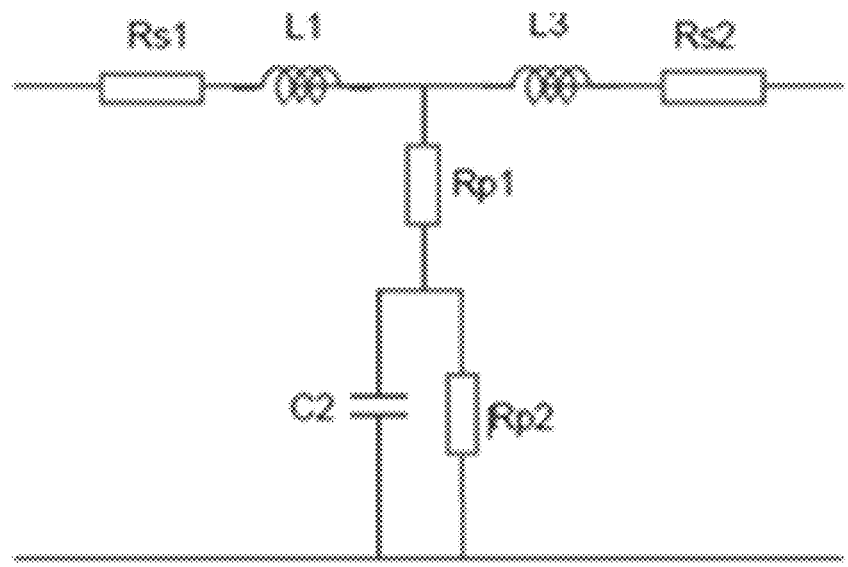
FIGS. 5A and 5B are examples of circuit diagrams conceptually illustrating an embodiment of the present technology in accordance with an aspect of the present disclosure.
Figure 5B:
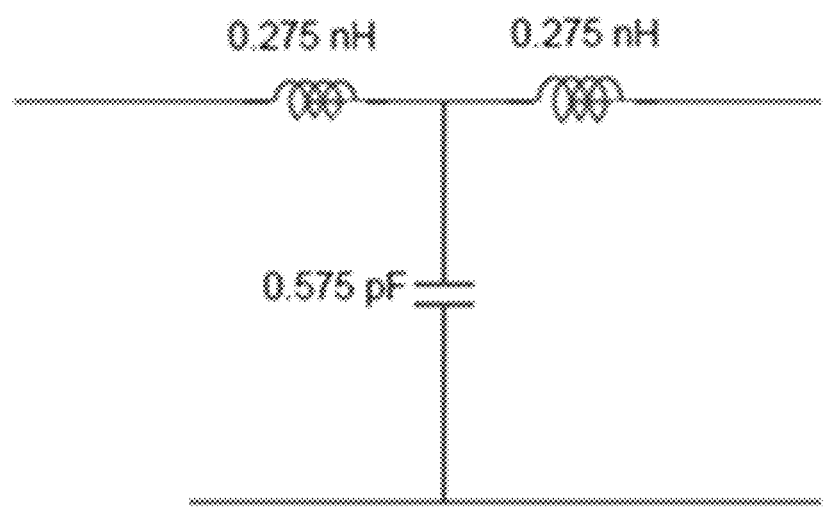
Figure 6:
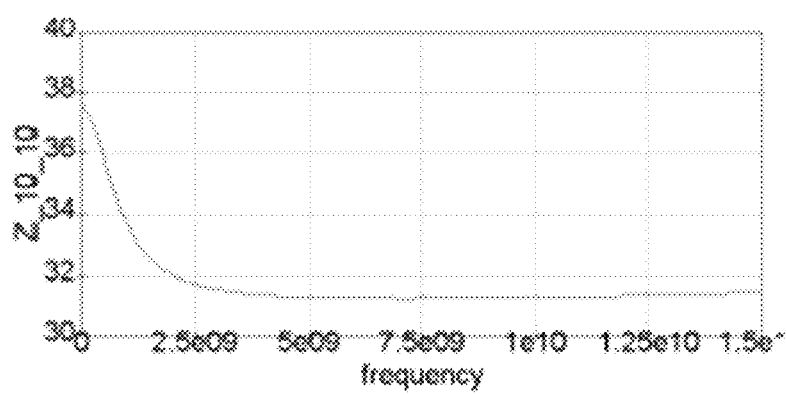
FIG. 6 is an example of a frequency response conceptually illustrating an embodiment of the present technology in accordance with an aspect of the present disclosure.

Further, FIGS. 5A and 5B illustrates equivalent circuits approximating the MZM modulator. That is, FIG. 5A illustrates an equivalent circuit approximating the MZM modulator and for the design of termination impedance using a low pass filter concept, FIG. 5B illustrates a schematic for the simplified circuit. FIG. 6 shows impedance of the modulator over a frequency range. In the example, it may be observed that resistive values mainly affect the impedance at less than 2 GHz when the impedance of the modulator is observed. As such, it may be noted that the approximation of the MZM modulator is valid at above 2 GHz.

Figure 7:
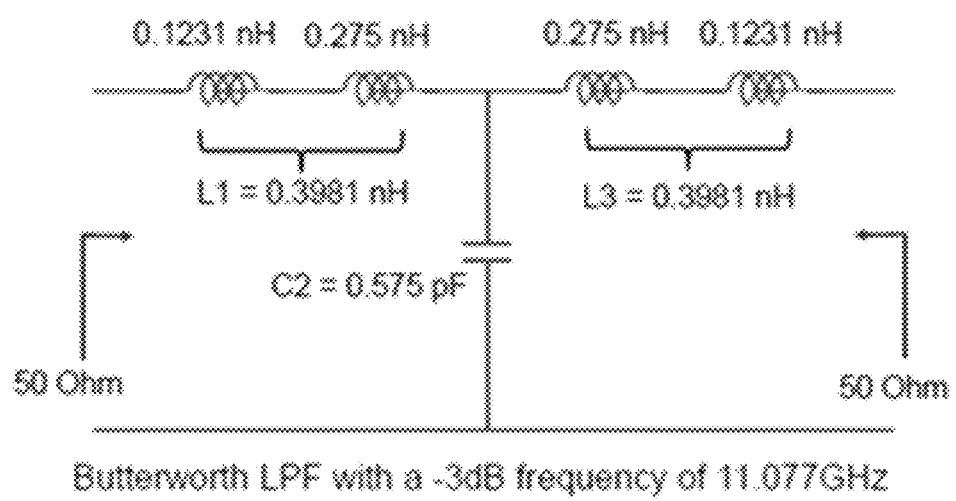
FIG. 7 is an example of a circuit diagram conceptually illustrating an embodiment of the present technology in accordance with an aspect of the present disclosure.

Scaling to a low pass filter (LPF). FIG. 7 illustrates a synthesized $3^{rd}$ order LPF in accordance with an aspect of the present disclosure. In an aspect of the present disclosure, it is noted that a Butterworth low pass filter has relatively large normalized capacitance. As such, a Butterworth low pass filter may be chosen to absorb an equivalent circuit of a transmission line. By way of example, in case of a $3^{rd}$ order Butterworth LPF, the normalized values may be chosen such that L1'=1, C2'=2, ad L3'=1 as shown in FIG. 5B. The normalized C2' is then scaled to a certain −3 dB frequency to have 0.575 pF with 50 Ohm source and load impedance, for example. Further, in an aspect of the present disclosure, an arbitrary source and load impedance may be chosen as well to absorb the capacitance and the inductances. In the example shown in FIG. 7, the −3 dB frequency of a Butterworth LPF obtained in this way may be 11.077 GHz. The inductance values obtained for L1 and L3 may be then 0.3981 nH. Thus, in the example, by adding, 0.3981 nH-0.275 nH=0.123 nH, the Butterworth LPF having 11.077 GHz may be synthesized.

Figure 8:
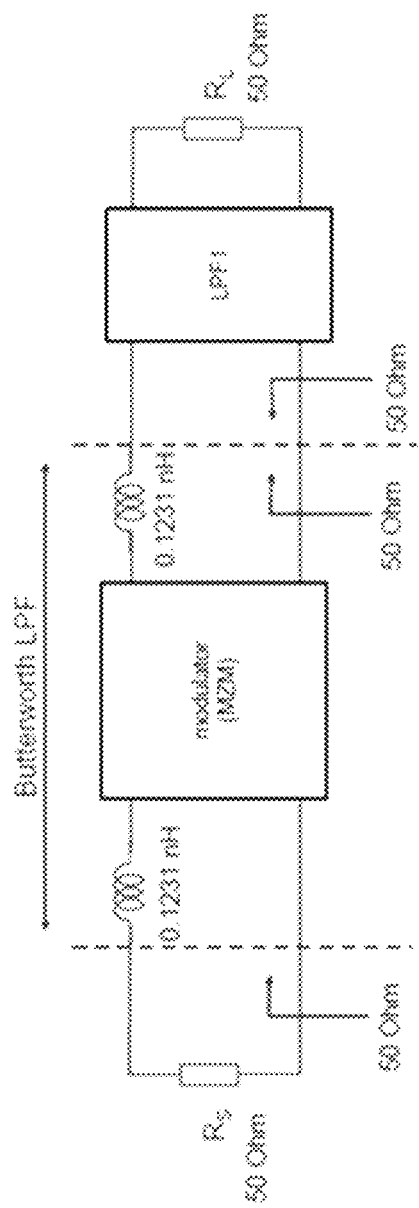
FIG. 8 is an example of a circuit diagram conceptually illustrating an embodiment of the present technology in accordance with an aspect of the present disclosure.

Modelling of MZM and Load Matching. FIG. 8 illustrates a synthesized low pass filter (e.g., LPF1) between an output of the Butterworth filter (e.g., at an output of the MZM) as shown in FIG. 7 and a load $R_L$ of 50 Ohm. As shown in FIG. 8, the low pass filter (e.g., LPF1) may be synthesized between the output of the Butterworth LPF and the load $R_L$.

In the example, by controlling a bandwidth (BW) of the LPF1, a response characteristic of the modulator (MZM) may be modified. Further, in the example, a reflected signal from the input of LPF1 (i.e., S11 of LPF1) is fed back to the modulator (MZM), and as a result, the fed back signal from the LPF1 modifies the S21 response and group delay of the modulator. This may be interpreted as follows. Some of the modulation signal going to the load impedance (e.g., $R_L$) is fed back into the modulator with a slight delay and improves the modulation efficiency. As a result, the frequency response of the modulator at high frequencies may be improved since the reflected signal at the high frequencies is greater than signals at lower frequencies. It is further noted that in general, the reflection from higher frequencies of LPF1 is greater than the one from lower frequencies.

Design of LPF for Termination. A low pass filter synthesis for LPF1 between the Butterworth LPF and the termination (e.g., $R_L$) may be carried out. In an aspect of the present disclosure, the bandwidth (BW) of the matching network (e.g., LPF1) may be much wider than the bandwidth of the Butterworth LPF. It is because the reflected signal S11 of the matching network LPF1 may be fed back into the Butterworth LPF and the reflected signal may contribute as a modulation signal. As a result, it is observed that the S21 bandwidth of the Butterworth LPF is widened and the group delay is flattened, that is, improved.

As such, it is important to choose an appropriate bandwidth of LPF1 and an appropriate filter type for the matching network LPF1. By way of example, in accordance with an aspect of the present disclosure, a Bessel type filter having about 3 times BW of the Butterworth LPF (i.e., 30 GHz) may be selected, for LPF1. By selecting the bandwidth of LPF1 in this way, some high frequency signal components may be fed back to the Butterworth LPF and thus the high frequency response of S21 of the modulator (MZM) may be compensated.

Figure 9:
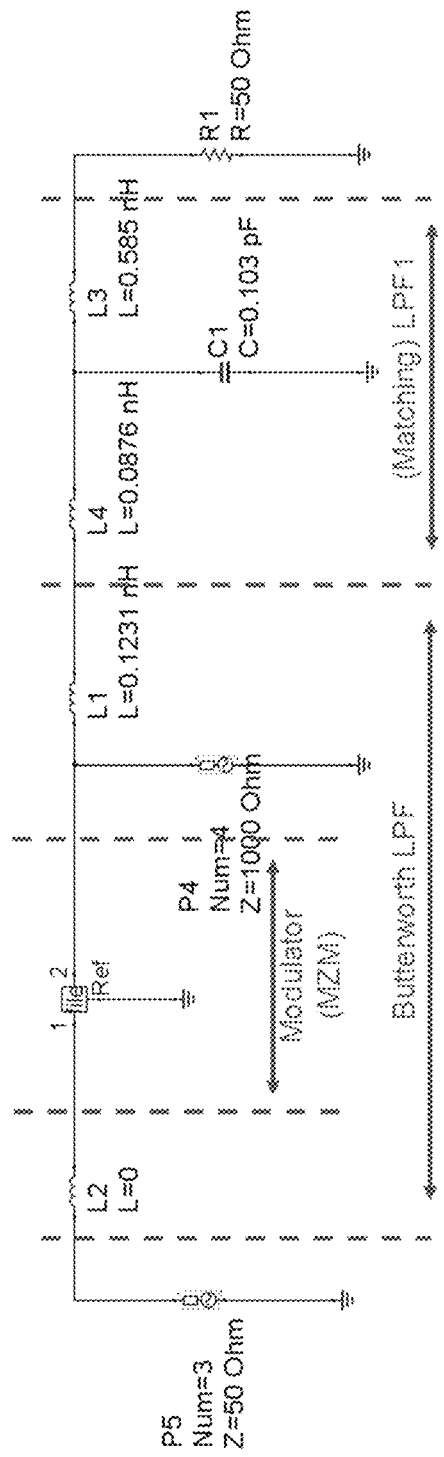
FIG. 9 is an example of a circuit diagram conceptually illustrating an embodiment of the present technology in accordance with an aspect of the present disclosure.

In one example, FIG. 9 illustrates synthesized component values of the modulator, the Butterworth LPF, and the matching network LPF1. For the matching network LPF1, a Bessel type LPF may be chosen to have L4=0.0876 nH, C2=0.103 PF, and L3=0.585 nH. Also, further optimization may be carried out by adjusting the bandwidth of the matching network LPF1. In an aspect of the present disclosure, if the equivalent LPF circuit of the MZM has an arbitrary source and load impedance, the synthesis of the matching network LPF1 has to be done with the arbitrary output impedance of the MZM LPF circuit. In the example, the inductance L2 may be part of the Butterworth LPF, and L2 is set to 0 for the purpose of simulating the modulator MZM response together with the termination on its right side including L1, L4, L3, C1 and R1. Further, in the example, L2 may be taken into account later when the input matching network is synthesized. Also, port 4 (e.g., P4) impedance is set to 1000 Ohm to not affect the network characteristics.

Figure 10A:
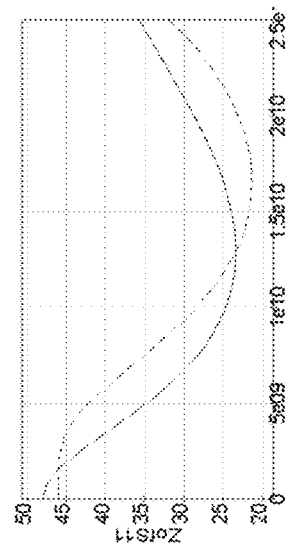
FIGS. 10A-10F are examples of simulation results including frequency responses, a Smith Chart, and a group delay response conceptually illustrating various aspects of the present technology.
Figure 10B:
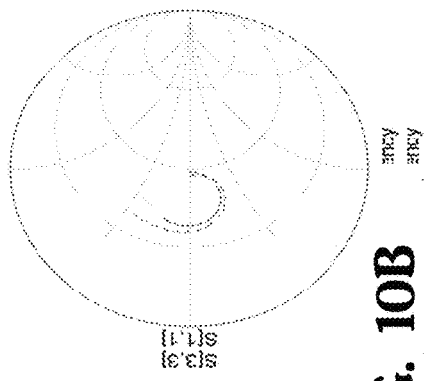
Figure 10C:
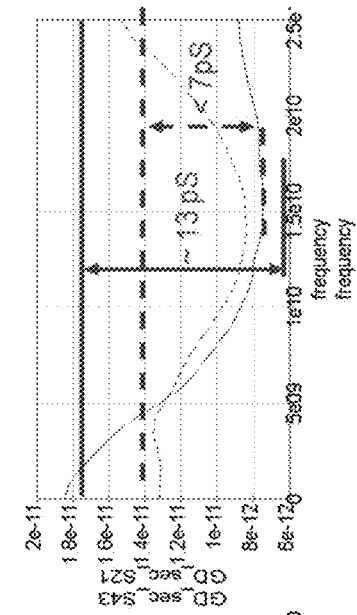
Figure 10D:
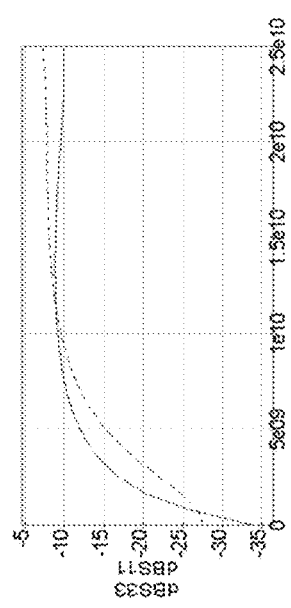
Figure 10E:
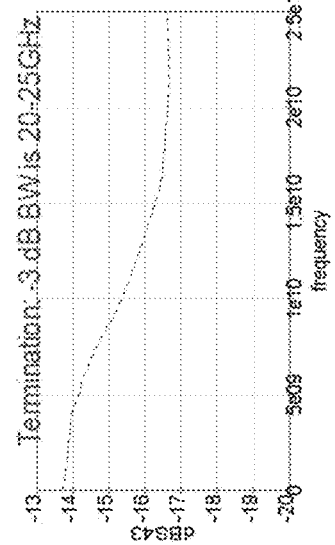
Figure 10F:
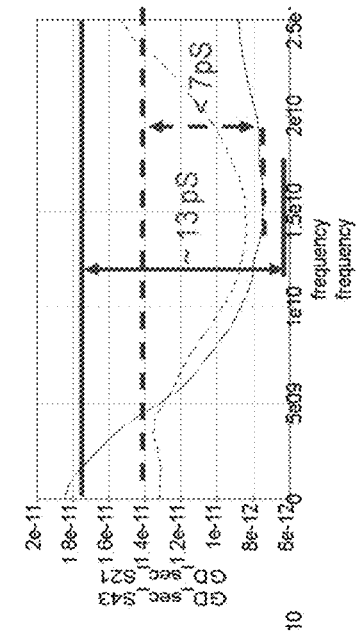

FIGS. 10A-F show various simulation results of the synthesized matching network LPF1 of FIG. 9. In the simulation results, solid lines represent the responses of the original MZM data of the modulator MZM with a 50 Ohm load, and dashed lines represent the responses with the synthesized matching network LPF1 and a 50 Ohm load. As can be seen in FIG. 10A and FIG. 10F, the response of dBS11 is shown to have improved up to 10 GHz and the group delay (GD) of the system has significantly improved with the synthesized matching network LPF1 (e.g., less than 7 ps compared to about 13 ps).

FIG. 10A shows input reflection responses (dBS11, dBS33). In the example, it may be noted that up to 12 GHz, the input reflection has been improved but it has slightly degraded at above 12 GHz. FIG. 10B shows a corresponding Smith Chart, further illustrating that the input reflection has improved as well at lower frequencies. FIG. 10C shows that the input impedance of the modulator MZM has increased slightly up to 13 GHz, which corresponds to FIGS. 10A and 10B, where the input reflection has improved from lower impedance toward 50 Ohm. The corresponding Smith Chart also shows that the original response curve moved toward 50 Ohm at the center of the Chart. Even though the curve slightly changed due to the termination with the synthesized matching network LPF1, the overall input impedance did not appear to change much.

Further, FIG. 10D shows the response of the original modulator MZM with the 50 Ohm load only, e.g., dBS21, without the synthesized matching network LPF1. The −3 dB frequency of dBS21 is a bit less than 10 GHz and the −6 dB frequency is about 25 GHz. It is noted that in contrast to the original response, FIG. 10E shows a significant improvement. That is, the response with the synthesized matching network LPF1 and 50 Ohm load shown in FIG. 10E shows a significant improvement made from 10 GHz to 20 GHz.

In the example, it is noted that the −3 dB frequency of the system with the synthesized matching network LPF1 (e.g., dBS43) is located at around 20 GHz. Further, FIG. 10F shows corresponding group delay (GD) responses of the system without the synthesized matching network LPF1 (e.g., dBS21) and with the synthesized matching network LPF1 (e.g., dBS43). As shown in FIG. 10F, the group delay variations have significantly improved from 13 ps max to 7 ps max over the entire frequency range. As a result, in the example, over the frequency range of 20 GHz, the group delay variation of the system may be reduced to less than half, compared to the one without the synthesized matching network LPF1. This further means that the linearity of the modulator MZM may be significantly improved, in an aspect of the present disclosure.

As a result, in various aspects of the present disclosure, by using the present technology, e.g., novel design methodology of an impedance matching network applicable to modulators, for example, Mach-Zehnder Modulators (MZMs), a wideband matching network may be implemented to further improve system performance including the frequency response. Thus, in an aspect of the present disclosure, the inductance of a LPF based matching network (that is designed through the impedance matching network) may be designed to absorb the inductance of bonding wires of the modulator including the MZM as part of the LPF, thereby mitigating (or even eliminating) degradation of a frequency response of the modulator MZM, e.g., degradation due to the adverse effects of the bonding wires. Further, by employing a LPF type matching network between the output of the modulator MZM and the termination, in addition to the significant improvement in the bandwidth of the modulator MZM, a significant reduction in variation of a group delay over the modulation bandwidth of the modulator MZM may be achieved.

In another aspect of the present disclosure, different methodologies may be implemented to absorb the inductance of bonding wires at an output of a modulator. By way of example, there may be various ways to absorb the inductance of bonding wires at the output of MZM LPF. One approach may provide, in an aspect of the present disclosure, that a combined inductance of L1 and L4 in FIG. 9 may be implemented as the inductance of the bonding wire. Then, the capacitance C1 and inductance L3 may be implemented in the submount of the modulator MZM. In another aspect of the present disclosure, the second approach may provide that a dummy inductance (L1+L4) and a dummy capacitance C1 may be implemented on the modulator MZM output port and the inductance L3 may be used to absorb the inductance of the bonding wire.

Further, in the event that the implementation of dummy components on the modulator MZM output port is difficult, a different type of LPF having $1^{st}$ order or $2^{nd}$ order filter LPF matching network may also be synthesized to make the methodology simple. Furthermore, it is noted that the inductance of the bonding wire may be realized by adjusting the length and shape of the bonding wire. If the inductance of the synthesized inductor is too small, it may be difficult to implement. Therefore, some attention may be paid to make sure that the synthesized inductance has a proper implementable value as a bonding wire.

Figure 11:
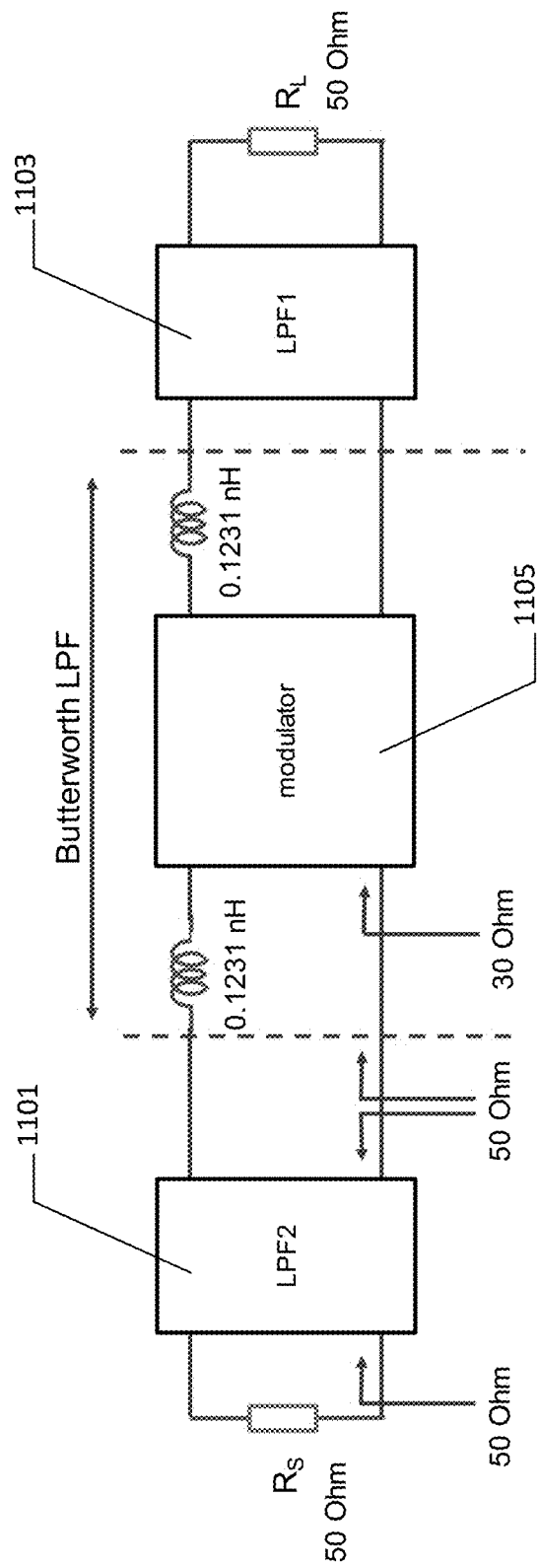
FIG. 11 is an example of a circuit diagram conceptually illustrating an embodiment of the present technology in accordance with an aspect of the present disclosure.

In another aspect of the present disclosure, to additionally decrease or eliminate the adverse effects of the bonding wires of the modulator MZM, in addition to the output matching network (or a termination network) as described herein, an input matching network may also be implemented, alone or in combination with the output matching network. By way of example, FIG. 11 illustrates one example design that includes an input matching network 1101 (e.g., LPF2) as well as an output matching network 1103 (e.g., the termination network LPF1). The Butterworth LPF may be disposed between the input matching network LPF2 and the output matching network LPF1 for the modulator MZM. In the example, modulator input impedance may be about 30 Ohm and it may be well maintained even with a termination network attached at an output of the modulator 1105, which means that the input impedance of the Butterworth LFP may also be kept around 50 Ohm.

As such, in the example shown in FIG. 11, two possible ways may be available to synthesize the input matching network 1101 LPF2 for input matching: Case 1 and Case 2. In particular, for Case 1 (a case of a 50 Ohm/30 Ohm output), the input matching network 1101 LPF2 may be matched to 30 Ohm impedance. In this case, the input impedance of the LPF2 may be 50 Ohm and the output impedance of the LPF2 may be 30 Ohm. Further, in Case 1, the inductance of 0.1231 nH of the Butterworth LPF may be absorbed as part of the LPF2.

As for Case 2 (a case of a 50 Ohm/50 Ohm Output), the input matching network 1101 LPF2 may be matched to 50 Ohm impedance. In this case, the input and output impedance may be 50 Ohm. Thus, the inductance of 0.1231 nH of the Butterworth LPF may need to be kept as-is as part of the Butterworth LPF to keep the input impedance of 50 Ohm.

Example implementation design methodology for input matching for Case 1 and Case 2 may be illustrated as follows.

Figure 12:
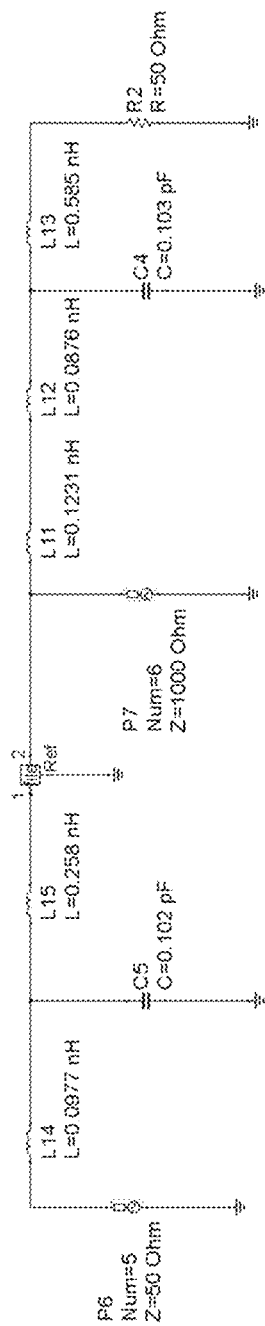
FIG. 12 is an example of a circuit diagram conceptually illustrating an embodiment of the present technology in accordance with an aspect of the present disclosure.

Case 1: Design of Input Matching LPF (50 Ohm/30 Ohm Output). FIG. 12 illustrates an example of a schematic diagram for the design of the input matching network LPF in an aspect of the present disclosure. It is noted that the input matching network LPF2 1101 as shown in FIG. 11 needs to have a very wide bandwidth in order to pass all input signal toward the modulator (e.g., MZM) 1105. As such, in one implementation and in an aspect of the present disclosure, the bandwidth of the input matching network LPF2 1101 may be chosen to have about five (5) times the bandwidth of the modulator 1105 (e.g., MZM). In the example, a $3^{rd}$ order Butterworth LPF may be selected for the input matching network LPF2 and each component thereof may be synthesized. When synthesizing the input matching network LPF2 1101 as shown in FIG. 11, since the input inductance L11 (i.e., 0.1231 nH) is part of the Butterworth LPF that is synthesized for the modulator 1105, an output inductance of the input matching network LPF2 1101 may absorb the input inductance L11 (e.g., 0.1231 nH) of the Butterworth LPF as part of the input matching network LPF2 1101. As such, the output inductance that is synthesized needs to be at least the same as the input inductance value L11 (e.g., 0.1231 nH) or be greater than the input inductance value L11 (e.g., 0.123 nH).

Figure 13C:
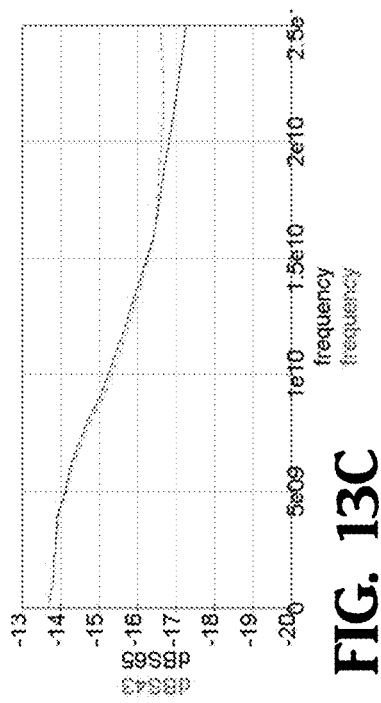
FIGS. 13A-13D are examples of simulation results including frequency responses, a Smith Chart, and a group delay response, conceptually illustrating various aspects of the present technology in accordance with an aspect of the present disclosure.
Figure 13D:
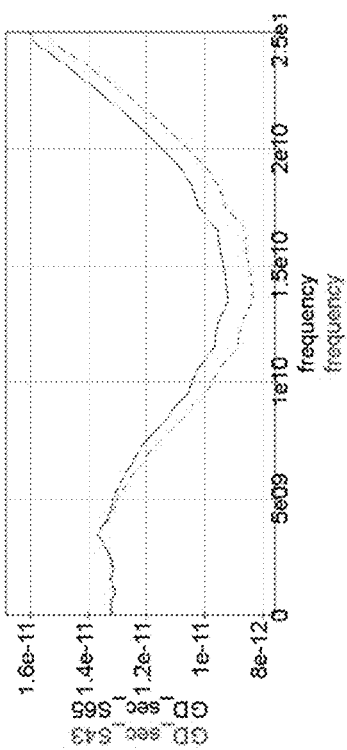
Figure 13A:
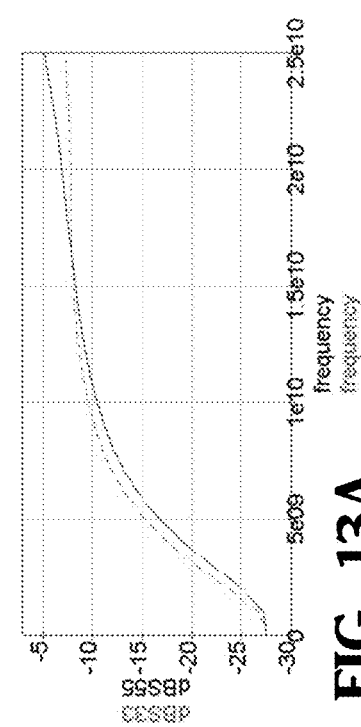
Figure 13B:
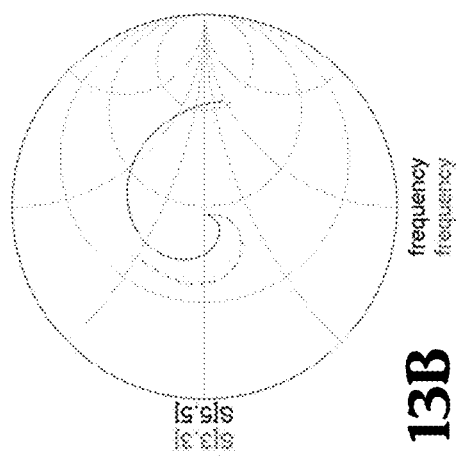

FIGS. 13A-13D show simulation results of Case 1 input matching network of FIG. 12. In FIGS. 13A-13D, dashed lines (e.g., dBS33) represent results of a design without an input matching network LPF2 (e.g., LPF2 1101), and solid lines (e.g., dBS55) represent results a design with an input matching network LPF2 (e.g., LPF2 1101). As shown in FIG. 13A, in the example, the input reflection is improved around up to 17 GHz and slightly degraded at above 17 GHz. The corresponding Smith Chart shown in FIG. 13B shows that input impedance matching has improved at a lower frequency side and that at higher frequency side the input impedance is moving to a higher impedance area in the Smith Chart. Further, FIG. 13C shows the frequency responses of two systems—one without the input matching network (i.e., dBS43) and the other with the input matching network (e.g., dBS65), which are almost identical to each other up to 17 GHz. However, at above 17 GHz, in the example of FIG. 13C, the frequency response with the input matching network LPF2 shows a slight degradation. Further, as for the group delay, as shown in FIG. 13D the two group delay curves (one for with the input matching network LPF2 and the other for without the input matching network LPF2) are adjusted to have the same values at low frequency (e.g., below 5 GHz) and show variations at high frequency (e.g., greater than 5 GHz). As such, it is noted that with the input matching network LPF2, the group delay is shown to have about 1 ps degradation at high frequency end. Nonetheless, over most of the frequency band, the group delay is shown to have improved by 1 ps up to around 22 GHz.

Figure 14:
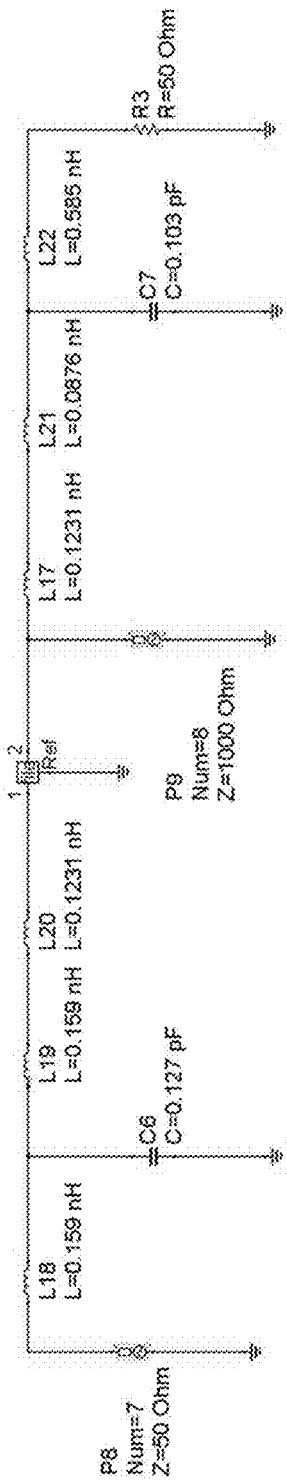
FIG. 14 is an example of a circuit diagram conceptually illustrating an embodiment of the present technology in accordance with an aspect of the present disclosure.

Case 2: Design of Input Matching LPF (50 Ohm/50 Ohm Output). FIG. 14 illustrates an example of a schematic diagram for the design of input matching network LPF in an aspect of the present disclosure. As mentioned above, the input matching network LPF2 1101 may need to have a very wide bandwidth in order to pass all input signal toward the modulator 1105. Thus, in an aspect of the present disclosure, in a similar manner to those with respect to FIG. 12, the bandwidth of the input matching network LPF2 1101 may be chosen to have about five (5) times that of the modulator 1105. In the example, a $3^{rd}$ order Butterworth LPF may be chosen for the input matching network LPF2 and each component of the LPF2 may be synthesized as illustrated in FIG. 14.

Figure 15A:
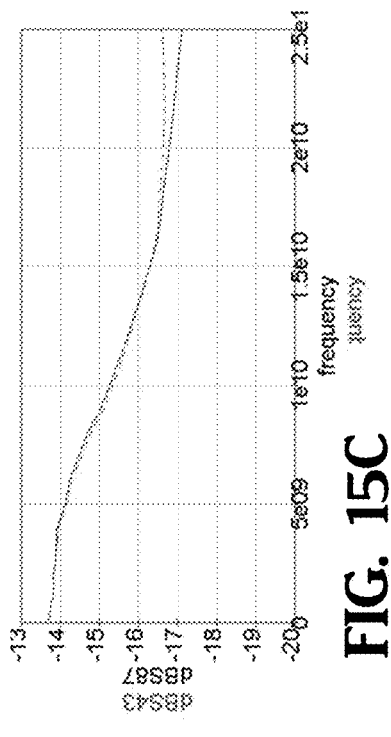
FIGS. 15A-15D are examples of simulation results including frequency responses, a Smith Chart, and a group delay response conceptually illustrating various aspects of an embodiment of the present technology in accordance with an aspect of the present disclosure.
Figure 15C:
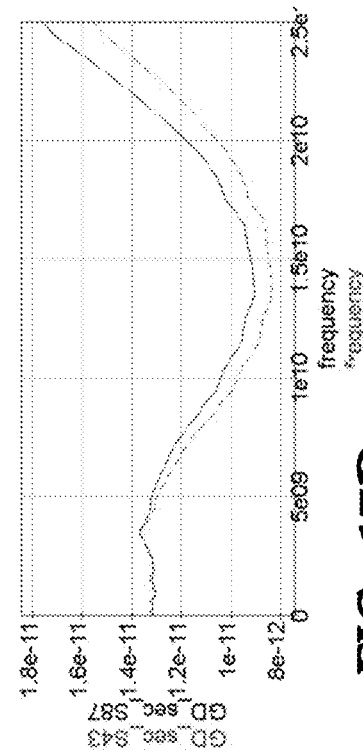
Figure 15B:
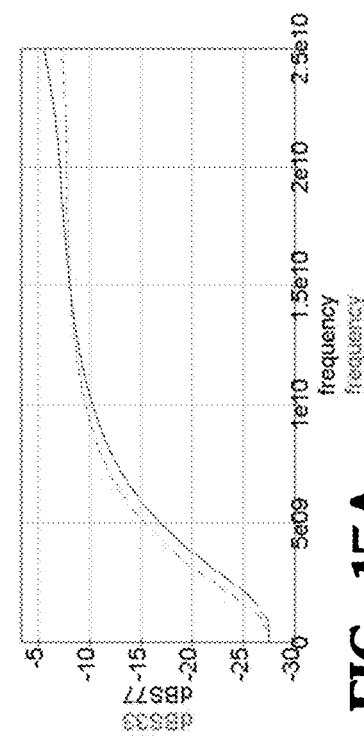
Figure 15D:
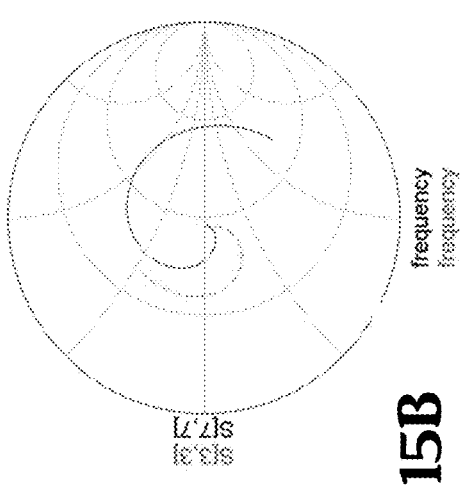

Simulation results of Case 2 may be shown as in FIGS. 15A-15D. In the simulation results, the dashed lines (e.g., dBS33) represent a design without the input matching network LPF2 1101, and the solid lines (e.g., dBS77) represent a design with the input matching network LPF2 1101. As shown in FIG. 15A, around up to 15 GHz, the input reflection has improved but slightly degraded at above 15 GHz. The corresponding Smith Chart shown in FIG. 15B illustrates that the input matching has improved at lower frequency but at higher frequency the input impedance is moving to a higher impedance area in the Smith Chart. It is also noted that the input matching of Case 1 is slightly better than the one of Case 2. Further, as shown in FIG. 15C, the frequency responses of both designs—one with the input matching network LPF2 (e.g., dBS43) and the other without the input matching network LPF2 (e.g., dBS87) are shown to be almost identical to each other up to 15 GHz. At above 15 GHz, however, the frequency responses slightly degrade. Further, FIG. 15D shows that the group delay curves for the group delay performance are illustrated to have substantially the same value at low frequency, but at high frequency, some variations. In particular, with the input matching network LPF2, the group delay is shown to have degraded less than 1 ps at high frequency end. However, over most of the frequency band, the group delay is shown to have improved by 1 ps up to around 22 GHz. As such, in comparison of Case 1 and Case 2, it may be noted that the amount of group delay variation of Case 2 is smaller than that of Case 1, which may be due to the degradation at high frequency end.

In an aspect of the present disclosure, for the input matching network LPF2, as shown in FIG. 11, a Butterworth type filter may be chosen arbitrarily with caution to absorb the inductance of 0.1231 nH (e.g., L11 or L17) of the Buttterworth LPF, which is an input part of the modulator 1105. Overall, as in Case 1 and Case 2, both designs show very similar input reflections, frequency responses and group delay performance. As such, in an aspect of the present disclosure, in synthesizing the input matching network LPF2 1101, either approach (e.g., Case 1 or Case 2) may be adopted.

Also, it is noted that the inductance L15 in FIG. 12, the inductance L19 and L20 in FIG. 14 correspond to a bonding wire between the modulator and the submount. Further, it is noted that parts such as inductors, capacitors, etc. can be implemented in the submount. Thus, by implementing the input matching network LPF2, in an aspect of the present disclosure, the effect of the inductance of bonding wires (e.g., the inductance L15 in FIG. 12, the inductance L19 and 20 in FIG. 14) may be absorbed in the input matching network LPF2 1101. As a result, a wideband modulator may be implemented without having any adverse effect due to the bonding wires of the modulator.

As mentioned above, the present technology described herein provides a novel design methodology for mitigating or reducing the effect of bonding wires. As discussed, often during packaging of MZM devices on submounts, bonding wires are inevitable components and it is noted that the inductance of the bonding wires degrade the frequency response of the MZM devices at high frequencies. This degradation especially becomes serious when the bandwidth of the MZM devices becomes very wide, for example, a bandwidth of more than 30 GHz. The present technology disclosed herein thus provides new, novel design methodologies to mitigate or reduce the effect of the bonding wires, thereby further improving the system characteristics (e.g., frequency response and/or group delay response) of the MZM devices at high frequencies.

In accordance with various aspects of the present technology, low pass filter (LPF) type circuit topology may be adopted for a wideband matching at an input and/or an output of a MZM on the submount to reduce or eliminate the adverse effects of the bonding wires between the MZM and the submount. That is, for a very wideband matching at the input and/or output of the MZM, low pass filter type matching networks may be designed and implemented to mitigate the adverse effects of the inductance of the bonding wires, thereby improving the frequency and group delay responses of the MZM at high frequencies, e.g., a bandwidth of more than 20 GHz.

Further, the adverse effects of bonding wires (e.g., extra inductance) at the input and/or the output of the MZM may be absorbed as part of the low pass filter type matching network. Furthermore, a low pass filter type matching network placed at the output of the MZM may provide special benefits. By way of example, an output matching network may improve frequency responses (S21) of the MZM significantly. In one example disclosed herein, the improved frequency response of the MZM resulted in a bandwidth gain of more than 2 times the original −3 dB bandwidth of the MZM. Also, the group delay variation may significantly improve. That is, the group delay variation in a system may be significantly reduced, i.e., by at least 50% of the original MZM modulator. Especially, smaller group delay may provide key benefits for the modulation of higher order modulation (HOM) signals such as PAM4 or PSKs. The reduction in the group delay is achieved by the matching network by packaging and electrical characteristics of the MZM itself. However, it is noted that the present technology does not improve the distortion caused by electrical to optical (EO) conversion process.

As such, a systematic synthesis methodology to absorb the effect of bonding wires may be introduced to avoid performance degradations due to the bonding wires between the MZM and the submount. In one embodiment, an L-C-L type equivalent circuit of MZM may be used to form a Butterworth low pass filter (LPF) to convert the MZM impedance to 50 Ohm. Further, as disclosed herein, two design approaches for the input matching may be used: one for matching to 50 Ohm of Butterworth MZM LPF, and the other for matching directly to the characteristic impedance of MZM. Additionally, the matching network to 50 Ohm of Butterworth MZM LPF may be disclosed for the output matching.

Further, instead of making an equivalent circuit of MZM and synthesizing a LPF network matching to 50 Ohm, input and/or output matching networks may be synthesized directly to the MZM characteristics impedance. Also, an arbitrary L-C matching network other than LPF may be used when the required frequency response of MZM is not very wide. As long as a synthesized matching network provides serial inductances at the input and the output with proper inductance values, those inductances may be implemented using bonding wires which may be absorbed as part of the matching networks.

In various aspects of the present disclosure, the present disclosure provides one or more systematic approaches of designing input and/or output matching networks for MZM to reduce or eliminate the effect of the inductance of bonding wires, as well as to significantly improve the frequency response and/or group delay characteristics, thereby improving the bandwidth or the frequency response of the MZM at high frequencies.

As used in the present disclosure, except explicitly noted otherwise, the term "comprise" and variations of the term, such as "comprising," "comprises," and "comprised" are not intended to exclude other additives, components, integers or steps.

The terms "first," "second," and so forth used herein may be used to describe various components, but the components are not limited by the above terms. The above terms are used only to discriminate one component from other components, without departing from the scope of the present disclosure. Also, the term "and/or" used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed as:

1. A method of absorbing inductance comprising:
using a low pass filter (LPF) type matching network configured to absorb inductance of bonding wires at a high frequency between an external optical modulator and a submount in a packaging of the external optical modulator.

2. The method of claim 1, wherein the LPF type matching network comprises a first matching network coupled to an input of the external optical modulator and a second matching network coupled to an output of the external optical modulator.

3. The method of claim 1, wherein the external optical modulator comprises a Mach Zehnder Modulator (MZM).

4. The method of claim 1, wherein the high frequency comprises a frequency greater than 10 GHz.

5. The method of claim 1, wherein the LPF type matching network comprises a $3^{rd}$ order Butterworth filter.

6. The method of claim 1, wherein the high frequency comprises a frequency comprises a frequency greater than 10 GHz.

7. The method of claim 1, wherein the LPF type matching network comprises a first matching network coupled to the output port of the MZM and wherein the first matching network includes a resistor, an inductor, and a capacitor and is configured to absorb inductance of the bonding wires.

8. The method of claim 7, wherein the LPF type matching network comprises a second matching network coupled to the input port of the MZM and the second matching network includes an inductor, and a capacitor and is configured to absorb inductance of the bonding wires.

9. The method of claim 1, wherein the LPF type matching network comprises a first matching network coupled to the output port of the MZM and a second matching network coupled to the input port of the MZM, and wherein the first matching network and the second matching network respectively comprises an inductor and a capacitor and is configured to absorb inductance of the bonding wires.

* * * * *